No. 749,720. PATENTED JAN. 19, 1904.
F. B. CONVERSE, Jr.
JUSTIFYING MECHANISM.
APPLICATION FILED AUG. 19, 1899.
NO MODEL. 2 SHEETS—SHEET 1.

Witnesses.
E. B. Gilchrist
H. M. Wise

Inventor.
Francis B. Converse Jr.
By his Attorneys,
Thurston & Bates

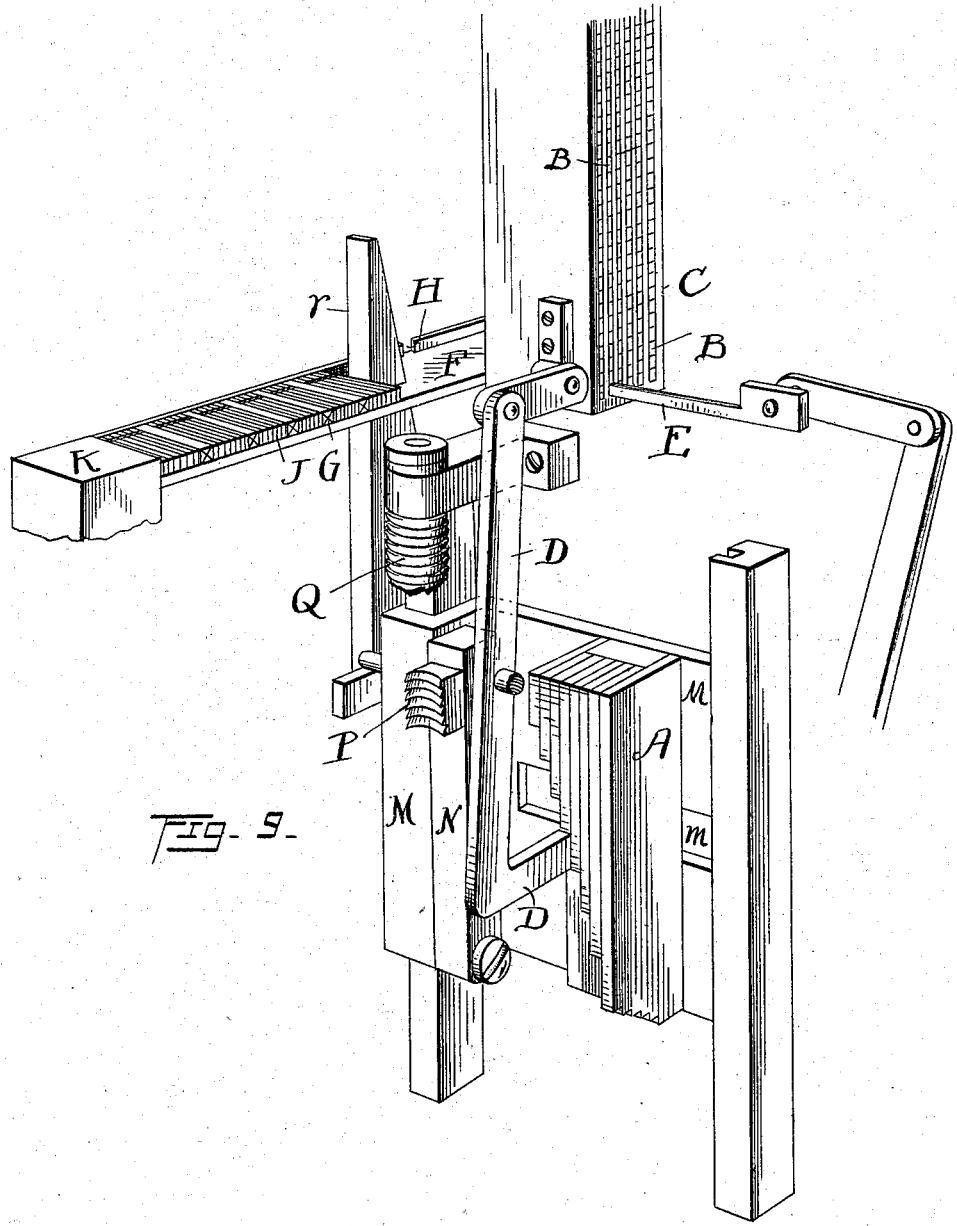

No. 749,720. Patented January 19, 1904.

UNITED STATES PATENT OFFICE.

FRANCIS B. CONVERSE, JR., OF LOUISVILLE, KENTUCKY, ASSIGNOR TO THE CONVERSE MANUFACTURING COMPANY, OF CLEVELAND, OHIO, A CORPORATION OF OHIO.

JUSTIFYING MECHANISM.

SPECIFICATION forming part of Letters Patent No. 749,720, dated January 19, 1904.

Application filed August 19, 1899. Serial No. 727,749. (No model.)

*To all whom it may concern:*

Be it known that I, FRANCIS B. CONVERSE, Jr., a citizen of the United States, residing at Louisville, in the county of Jefferson and State of Kentucky, have invented a certain new and useful Improvement in Justifying Mechanism, of which the following is a full, clear, and exact description, reference being had to the accompanying drawings.

My Patent No. 717,169, issued December 30, 1902, for a type setting and justifying machine, to which reference is hereby made, shows and describes mechanism for setting a line of type and temporary spaces, mechanism for keeping account of the number of spaces set, mechanism for measuring the space available for justification, a selecting-block composed of a plurality of series of steps, mechanism for shifting the block in the direction from one step to the next in a series according to the shortness of the line to be justified, and mechanism for shifting it in the direction from one series to the next according to the number of spaces to be justified, a plunger adapted to engage with the selecting-block and stand in a different position according to the position of the selecting-block and so connected that its position determines the size of permanent space to be substituted for a temporary space in the line. In the machine there shown the thickness of the temporary spaces in the line is compensated for before the measurement takes place by a gage-piece which moves back from the end of the line a distance equal to the thickness of the temporary space for each space inserted. Such construction is thoroughly practicable, but involves some mechanism which I have discovered can be obviated.

The purpose of the present invention is to provide a form of selecting-block which shall not require the previous elimination from the calculation of the thickness of the temporary spaces and which therefore will allow the line to be measured against a rigid stop.

The invention may be best summarized as consisting in the selecting means having the characteristics hereinafter described, and definitely specified in the claims.

Figure 1:
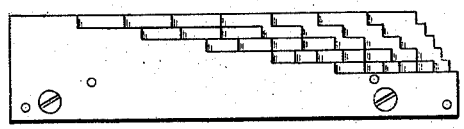
Figure 2:
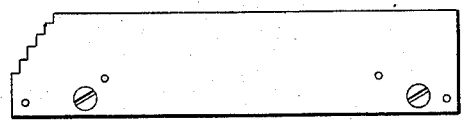
Figure 3:
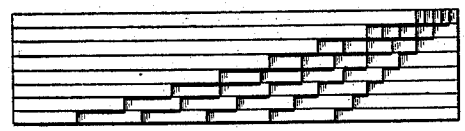
Figure 4:
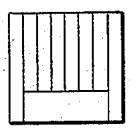
Figure 6:
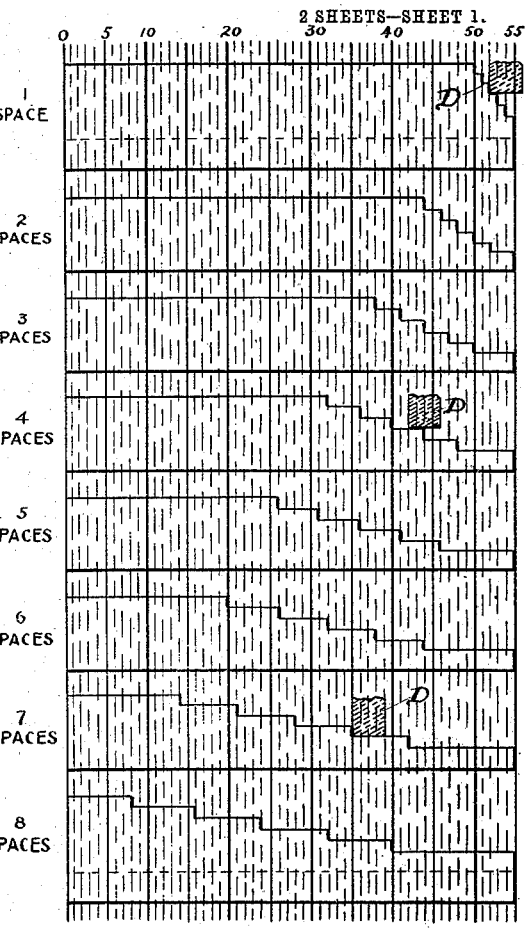
Figure 7:
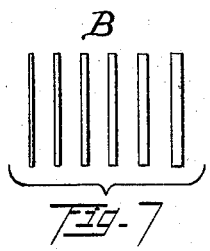
Figure 8:
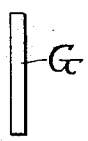
Figure 5:
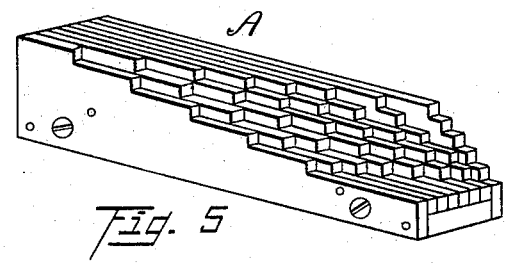

The drawings are in the nature of diagrams, but clearly illustrate my invention. All the figures but the last refer to the selecting-block itself, as follows:

Figures 1 and 2 are side elevations from opposite sides of the block. Fig. 3 is a plan and Fig. 4 an end view of the same. Fig. 5 is a perspective view of the block. Fig. 6 is a diagram showing side elevations of each of the strips of the block. Fig. 7 is a diagram illustrating the different sizes of permanent spaces with which the block is adapted to be used. Fig. 8 is a corresponding diagram representing the temporary space employed. Fig. 9 is a segregated perspective view of the mechanism for carrying out the present invention.

The selecting-block A is composed of a series of stepped strips, there being as many strips as the maximum number of spaces in a line which the machine is adapted to justify and there being as many steps, including the top and bottom step, as there are different sizes of spaces which the machine may place. The block shown in the drawings is designed to justify a line with eight or less spaces by inserting permanent spaces which may be selected from six different sizes.

It is to be understood that the number of spaces in the line on which the machine may operate may be indefinitely increased by adding strips to the block, and the number of sizes of spaces which they insert may be likewise increased by a corresponding increase in the number of steps on each strip.

The assembled line, composed of type J and temporary spaces G, lies on a suitable support F and is measured against a rigid block by a wedge L, which raises a plate M a distance proportionate to the amount the composite line is shorter than the original distance between the block K and the face of the depressed wedge. This original distance is equal to the width of the desired line after justification plus the algebraic excess of the aggregate thickness of the maximum number of temporary spaces over the aggregate thickness of the maximum number of the thinnest size of permanent spaces.

The plate M carries an arm N, which has a a ratchet-threaded partial nut P, which is forced by a spring (not shown) into engagement with the correlatively-threaded screw Q, which extends in front of the nut P, but is broken away in the drawings for clearness.

The selecting-block A is carried by the plate M rigid longitudinally, but shiftable laterally, and thus the selecting-block is moved longitudinally a distance dependent on the shortness of the composite line. Suitable mechanism takes account of the number of temporary spaces in the line and engaging the selecting-block through a slot $m$ in the plate M shifts it laterally accordingly.

The permanent spaces B are arranged in order in a suitable space-case C, which is suitably connected with a plunger D, adapted to engage with the treads of different steps of the selecting-block. If the plunger is in engagement with the top step, the space-case is in such position that the thinnest permanent space is in line with an ejector E to be moved into the line of type, the ejector shoving the permanent space into the line on the support F against the temporary space G, which is thereby discharged through the opening H.

If the plunger engages with the second step, the next larger size of permanent space would be inserted, and so on. With the exception of the top step the steps of the first strip are one unit in length of their treads, those of the second strip two units, those of the third strip three units, and so on.

The block herein shown differs from that in the said prior application only in the length of the top step or, more accurately, in the distance of the active corner of the top step from a given datum-line, which for convenience is preferably the end of the block. After the block has made its initial measurement its operation is the same as that shown in the prior application and will not be elaborated herein. Suffice it to say that after the substitution of each permanent space for a temporary one the screw Q is revolved sufficiently to advance the selecting-block—i. e., move it upward—one unit.

I will now give a mathematical explanation of the location of the block K and of the length of the strips of the selecting-block A. If the machine may replace eight temporary spaces and each temporary space is .10 of an inch in thickness and the thinnest permanent space is .03 inch in thickness, (which is the form shown in the drawings,) eight temporary spaces would occupy .56 inch more than eight permanent spaces of the thinnest size, and if the width of the column is two inches, for example, the stop K, against which the line is measured, would stand from the position of the wedge $r$ 2.56 inches distant before the measuring takes place. Then when the measuring mechanism advances to compact the line against such stop if there are eight temporary spaces in the line the space between the initial position of the face of the wedge and the end of the line is due only to the shortness of the line. If the line has less than eight temporary spaces, the measuring mechanism must first move sufficiently to take up all the remaining space allowed for temporary spaces, and then it begins to measure the shortness of the line. If there are seven temporary spaces in the line, the wedge must move toward the line one-eighth of the .56 inch added to the width of the column before it begins to measure the shortness of the line. This gives the wedge seven units of initial longitudinal movement and as much more as the shortness of the line causes. If there are six spaces in the line, this initial longitudinal movement would be fourteen units, being the difference between the maximum number of temporary spaces which might be inserted and the number which are inserted—i. e., two—multiplied by the difference between the number of hundredths of an inch (or whatever the constructive denomination is) in the thickness of the temporary space and the thinnest permanent space. Now if the line contains eight temporary spaces and requires the thinnest size of permanent space to justify it it will be before justification the longest line possible and will just fill the available space between the wedge and the stop K, against which the line is measured, and the wedge will not rise, and hence for this strip the top step need be only eight units long, the plunger standing at the very end of the block at the first substitution and the block advancing one unit for each substitution, leaving the plunger at the other end of the top step, but still on it for the last substitution. If the line contains seven temporary spaces to be replaced by the smallest size of permanent space, the wedge has an additional movement of seven units before it has taken up the space added for the missing temporary space, and beyond that distance the top step must extend seven units, so that the plunger will be on the top step at the last substitution. Thus the top step of the next strip is seven plus seven or fourteen units. If the line contains six temporary spaces, the initial eliminating movement of the wedge in units is twice the number of hundredths of an inch difference between .10 and .03—that is, twice .07 or fourteen units—and there must be six units beyond this for the plunger to rest on, which makes the top step of the sixth strip twenty units long. If the line contains five temporary spaces, there would be twenty-one units of movement before the block is acted upon by the plunger in the fullest line, and there will be five units of movement of the block after that, making the top step twenty-six units long. It will thus be seen that the length of the top step of any strip in units is equal to the difference between the total number of spaces which the machine may justify and the number of spaces in the line this particular strip is designed to justify multiplied by the difference between the number of hundredths of an inch thickness of the temporary space and the thinnest permanent space plus the number of the strip, or, putting it in an algebraic form, if N equals the number of the strip—that is, the number of spaces that strip operates with—$X_n$ the length of the top step of that strip in units, T the thickness of the temporary space, and P the thickness of the thinnest permanent space, (T and P being in the denomination corresponding to the selecting-block unit,) and S the total number of spaces in the line which the machine may justify, the formula for the length of the top step of any strip is $X_n = (S-N)(T-P)+N$.

In the block shown in the drawings S equals eight, T equals ten, and P equals three. Therefore $X_n = (8-N)(10-3)+N$. $X_n = 7(8-N)+N$. $X_n = .56-7N+N$. $X_n = .56-6N$.

The following table gives in units the length of the top step of the block and the threads of the other step for each strip.

| Number of strip N. | Top step $X_n = (S-N)(T-P)+N$ | Subsequent steps each. |
|---|---|---|
| 1 | 50 | 1 |
| 2 | 44 | 2 |
| 3 | 38 | 3 |
| 4 | 32 | 4 |
| 5 | 26 | 5 |
| 6 | 20 | 6 |
| 7 | 14 | 7 |
| 8 | 8 | 8 |

A few concrete examples of the operation of the selecting-block will now be given, it being remembered that when the plunger is in engagement with the top step the thinnest permanent space is selected. When it is in engagement with the next to the top step, the next thicker is selected, it being also remembered that the block is advanced after the insertion of a permanent space a distance equal to one unit.

Suppose the line to be justified contains one temporary space and is .06 of an inch too short. The wedge would then move forty-nine units to take up the space allowed for the seven temporary spaces which are not in the line, (seven units per temporary space,) and of the .06-inch shortness of the line the one temporary space which is in the line would take up .03 inch, (the difference between the actual thickness of the temporary space .10 and the amount of space allowed for it, .07,) and thus there would remain .03 inch for the wedge to take up, and this would give the wedge three units movement in addition to its forty-nine units or fifty-two units, which would bring the fourth step directly beneath the plunger, as shown on strip No. 1 of Fig. 6.

Suppose the line contains four temporary spaces and is .26 inch too short. The wedge would move twenty-eight units to take up the space allowed for the four temporary spaces which are not there and would then move fourteen units—that is, the difference between twenty-six units and twelve units—which the four temporary spaces which are there take up—i. e., the wedge would move forty-two units—and thus the plunger descends on the fourth step with its edge two units from the edge of that step. The first permanent space inserted will therefore now be of the fourth size of .06 inch thick. After its insertion the block is advanced one unit, the plunger is on the last unit of this fourth step, and another permanent space of .06 inch is inserted. After its insertion the block is advanced another unit, and this allows the plunger to pass onto the fifth step, causing the selection this time of a space .07 inch in thickness. After this insertion the block is advanced another unit, which leaves the plunger still on the fifth step, and the fourth permanent space inserted is of .07 inch thickness. Thus two spaces of .06 and two of .07 inches have been substituted in the line for temporary spaces, making a total of $2 \times .06$ and $2 \times .07$ or $.12 + .14$ or .26 inch, which is the required amount of space.

As a further illustration, suppose a line containing seven temporary spaces is .49 inch too short. In this case the seventh strip will be brought under the plunger and the block will move seven units allowed for the one temporary space which is not in the line and the difference between forty-nine units and twenty-one units which the seven temporary spaces which are there take up—i. e. seven units plus twenty-eight units or thirty-five units. Thus the plunger descends on the very edge of the fifth step, and the fifth size of permanent spaces will be inserted throughout the line, for while the block is advanced one unit for each space inserted there are seven units on this step, and the plunger will therefore remain on the step throughout, and seven permanent spaces of .07 inch thickness or .49 inch in the aggregate will be inserted.

It is to be understood that the thickness of the temporary space is chosen simply for convenience and bears no fixed relation to the permanent spaces. It might be the size of the thinnest permanent space, in which case the stop against which the line is measured would stand from the other end of the line before measurement a distance just equal to the width of the column. In this case the first term of the formula cancels and the length of the top step is equal to the number of the strip. If the temporary spaces were omitted altogether, the formula would still apply, the length of the top step of some of the strips being a minus quantity, which would mean that they were distant that much in the other direction from an intermediate datum-line.

By subtracting from the formula for one top step from that of the next smaller a formula is obtained for the difference (D) between any two consecutive steps, thus $$D = (S-N)(T-P) + N - \left[(S-[N+1])(T-P) + (N+1.)\right]$$

performing the operations indicated $$D = T - P - 1$$

in the present case, where T equals ten and P equals three—

$$D = 10 - 3 - 1 = 6.$$

Having described my invention, I claim—

1. A space-selecting block for a justifying mechanism composed of a plurality of series of steps, the first step measured from a given datum-line being of different length in the different series, which length is defined by the following mathematical relation, namely: the number of the particular series in which the step is located, plus the product of the difference between the maximum number of spaces in the line which the machine may justify and the number of the particular series, multiplied by the difference between the thickness of the temporary space and the thickness of the thinnest permanent space.

2. A space-selecting block for a justifying mechanism composed of a plurality of series of steps, the difference in length in units of the beginning steps of consecutive series being a constant which is one less than the difference between the thickness of the temporary space and the thickness of the thinnest permanent space.

3. A space-selecting block for a justifying mechanism composed of a plurality of series of steps, the first step measured from a given datum-line being of different length in the different series, which length is defined by the following mathematical relation, namely: the number of the particular series in which the step is located, plus the product of the difference between the maximum number of spaces in the line which the machine may justify and the number of the particular series, multiplied by the difference between the thickness of the temporary space and the thickness of the thinnest permanent space, combined with mechanism for measuring the amount which a given line of type and temporary spaces is less than a certain definite distance, which distance is the same for all lines for the same column and is equal to the width of the column plus the maximum number of spaces in the line which the machine may justify multiplied by the difference between the thickness of the temporary space and the thickness of the thinnest permanent space.

4. In a type-justifying mechanism, mechanism for measuring the amount which a given line of type and temporary spaces is less than a certain definite distance which distance is the same for all lines for the same column and is equal to the width of the column plus the algebraic excess of the aggregate thickness of the maximum number of temporary spaces over the aggregate thickness of the maximum number of the thinnest size of permanent spaces, combined with a selecting-block which governs the size of permanent spaces selected and which is shifted relative to its connection therewith under two influences, one of which is the above-mentioned absolute measurement not eliminating the temporary spaces and another of which is the number of spaces in the line, said selecting-block being composed of a plurality of series of steps the first step measured from a given datum-line being of different length in the different series, which length is defined by the following mathematical relation, namely: the number of the particular series in which the step is located, plus the product of the difference between the maximum number of spaces in the line which the machine may justify and the number of the particular series, multiplied by the difference between the thickness of the temporary space and the thickness of the thinnest permanent space.

5. A mechanism for justifying a line of type having interspersed temporary spaces, which includes a wedge which moves until stopped by compacting the line and thereby measures the amount which such composite line is less than a certain definite distance which definite distance is equal to the length the line is to be when justified plus the algebraic excess of the aggregate thickness of the maximum number of temporary spaces which the machine will justify over the aggregate thickness of the maximum number of the thinnest size of permanent spaces, and mechanism for causing this measurement to vary selecting mechanism, whereby when another variation according to the number of spaces has been given the proper size of permanent space is selected.

6. In a mechanism for justifying type, a wedge which moves until stopped by compacting the line against a stop which is rigid during the justification of one line, combined with said stop which is distant from the initial effective position of the wedge a distance equal to the length which the line is to be when justified plus the algebraic excess of the aggregate thickness of the maximum number of temporary spaces the machine may justify over the aggregate thickness of the maximum number of the thinnest size of permanent spaces, combined with space-selecting mechanism governed by said wedge.

7. In a justifying mechanism, in combination, measuring mechanism including a wedge for measuring the distance which a given composite line of type and temporary spaces is less than a definite distance which definite distance is equal to the length the line is to be when justified plus the algebraic excess of the aggregate of the thinnest size of permanent space, a case of permanent spaces, and a coöperating space-selecting block moved with relation to its connection with the permanent space-case according to the mechanism just mentioned and according to the number of spaces to be justified for selecting the proper size of permanent space, said space-selecting block being composed of a plurality of series of steps, the difference in length in units of the beginning steps of consecutive series being a constant which is one less than the difference between the thickness of the temporary space and the thickness of the thinnest permanent space.

In testimony whereof I hereunto affix my signature in the presence of two witnesses.

FRANCIS B. CONVERSE, Jr.

Witnesses:
ALBERT H. BATES,
H. M. WISE.